United States Patent
Krakow

(10) Patent No.: US 12,084,872 B2
(45) Date of Patent: Sep. 10, 2024

(54) DECK INSTALLATION DEVICE AND A METHOD OF USING SAID DEVICE

(71) Applicant: Innovative Enterprises of Princeton, LLC, Princeton, WI (US)

(72) Inventor: Travis M. Krakow, Menasha, WI (US)

(73) Assignee: Innovative Enterprises of Princeton, LLC, Princeton, WI (US)

( * ) Notice: Subject to any disclaimer, the term of this patent is extended or adjusted under 35 U.S.C. 154(b) by 447 days.

(21) Appl. No.: 17/565,703

(22) Filed: Dec. 30, 2021

(65) Prior Publication Data

US 2023/0212866 A1 Jul. 6, 2023

(51) Int. Cl.
*G01B 5/25* (2006.01)
*E04F 21/22* (2006.01)

(52) U.S. Cl.
CPC .............. *E04F 21/22* (2013.01); *G01B 5/25* (2013.01)

(58) Field of Classification Search
CPC .................................. E04F 21/22; G01B 5/25
USPC ................. 33/526, 527, 533, 562, 613, 645
See application file for complete search history.

(56) References Cited

U.S. PATENT DOCUMENTS

| | | | | |
|---|---|---|---|---|
| 3,183,598 A * | 5/1965 | Parr | ....................... | B28D 1/225 33/527 |
| 4,930,225 A | 6/1990 | Phillips | | |
| 5,123,172 A * | 6/1992 | Thrun | ..................... | E04F 21/00 33/526 |
| 5,248,127 A * | 9/1993 | Young | ..................... | E04F 21/22 254/15 |
| 5,826,858 A * | 10/1998 | Gordon | ................... | E04F 21/22 254/17 |
| 6,508,010 B2 * | 1/2003 | Hanson | ............... | E04F 21/0092 33/526 |
| 7,044,460 B2 * | 5/2006 | Bolton | .................... | B25B 23/00 269/37 |
| 7,913,413 B2 * | 3/2011 | McHowell | ............... | G01B 3/30 33/645 |

(Continued)

OTHER PUBLICATIONS

Amazon, "Hillman 48480 Deck Spacer Tool 2 Pack", retrieved from the internet on or before Sep. 10, 2020 at https://www.amazon.com/Hillman-Spacer-Boards-Fasteners-2-Pack/dp/B071245LJ5/ref=sr_1_35?dchild=1&keywords=Deck+Tools&qid=1599677838&sr=8-35, 8 pages filed herewith.

(Continued)

*Primary Examiner* — George B Bennett
(74) *Attorney, Agent, or Firm* — Amundsen Davis, LLC

(57) ABSTRACT

A unitary deck installation device is disclosed having first, second and third members joined together. All three members have a first end and a second end, a first side and a second side, a first surface and a second surface, a thickness measured between the first and second surfaces, a width measured between the first and second sides, and a length measured between the first and second ends. The first end of the second member is secured to the first end of the first member and extends perpendicularly outward from the second surface of the first member. The first end of the third member is secured to the second surface of the first member and extends perpendicularly outward therefrom. A pair of spaced apart holes is formed through the third member and each of the pair of holes has a diameter large enough to allow a fastener to pass therethrough.

21 Claims, 4 Drawing Sheets

(56) References Cited

U.S. PATENT DOCUMENTS

| | | | | |
|---|---|---|---|---|
| 7,941,987 | B1* | 5/2011 | Raim | E04F 21/0092 52/749.11 |
| 8,028,434 | B2 | 10/2011 | McHowell | |
| 8,307,564 | B1 | 11/2012 | Heaton | |
| 8,601,705 | B2* | 12/2013 | Bierman | G01B 3/30 33/613 |
| 8,881,419 | B2 | 11/2014 | Madrack | |
| 9,121,187 | B1* | 9/2015 | Bunch | E04F 21/0092 |
| 9,216,847 | B2 | 12/2015 | Belinda et al. | |
| 9,751,197 | B2 | 9/2017 | Vandenberg | |
| 10,988,947 | B2* | 4/2021 | Sheppard | G01C 9/34 |
| 11,719,002 | B2* | 8/2023 | Haas | E04F 15/02183 52/582.1 |
| 2006/0265895 | A1* | 11/2006 | Daugherty | G01B 3/04 33/613 |
| 2008/0010846 | A1* | 1/2008 | Bingham | E04F 21/0092 33/613 |
| 2008/0141617 | A1* | 6/2008 | Joski | E04F 21/0092 52/749.11 |
| 2008/0178484 | A1* | 7/2008 | Cother | E04F 15/04 33/526 |
| 2009/0126213 | A1* | 5/2009 | Tavy | E04F 21/0092 33/527 |
| 2010/0083610 | A1 | 4/2010 | King | |
| 2015/0152657 | A1* | 6/2015 | Reed | E04G 21/1891 33/526 |
| 2020/0011073 | A1 | 1/2020 | Sheppard et al. | |

OTHER PUBLICATIONS

Amazon, "Johnson Level & Tool 60-275 Deck Mate, Deck Board Spacing Tool, Orange, 1 Level", retrieved from the internet on or before Sep. 10, 2020 at https://www.amazon.com/Johnson-Level-Tool-60-275-DeckMate/dp/B0009WG57G/ref=sr_1_18?dchild=1&keywords=Deck+Tools&qid=1599677838&sr=8-18, 9 pages filed herewith.

Decksdirect, "Camo Hidden Deck Fastener System" YouTube video, retrieved from the internet on or before Sep. 10, 2020 at https://www.youtube.com/watch?v=-QSA-kufCtY, 82 pages filed herewith.

Ebay, "Speedeck Decking Spacing Gauge Pro Tool", retrieved from the internet on or before Sep. 10, 2020 at https://www.ebay.fr/itm/262512718314, 4 pages filed herewith.

Fastcap, "Jig-A-Deck System", retrieved from the internet on or before Sep. 10, 2020 at https://www.fastcap.com/product/jig-a-deck-system, 3 pages filed herewith.

Fastenmaster, "TrapEase 3 Ultimate Composite Deck Screw", retrieved from the internet on or before Sep. 10, 2020 at https://www.familyhandyman.com/wp-content/uploads/2017/09/deckfasteners1.jpg, 1 page filed herewith.

Kreg Tool, "Deck Jig™—Concealed Decking Made Easy!" YouTube video, retrieved from the internet on or before Sep. 10, 2020 at https://www.youtube.com/watch?v=OtTh-Q8Dkfw, 75 pages filed herewith.

Pinterest, "Easy Deck-Building Tip", retrieved from the internet on or before Sep. 10, 2020 at https://www.pinterest.com/pin/104779128804030755/, 1 page filed herewith.

See Addendum A, 3 pages filed herewith.

* cited by examiner

DECK INSTALLATION DEVICE AND A METHOD OF USING SAID DEVICE

FIELD OF THE INVENTION

This invention relates to a deck installation device used in the building construction industry. More specifically, this invention relates to a deck installation device for insuring proper spacing and installation of deck planking and fasteners in the construction of patio decks and deck railings having spindles or slats. A method of using said deck installation device is also taught.

BACKGROUND OF THE INVENTION

The building construction trade is a relatively fast paced industry where pressure is exerted on those engaged in such labor to work as quickly as possible, particularly as favorable weather permits. However, the major portion of such work is hand labor; very little has been accomplished in the way of mass production methods, or the development of tools and equipment, other than power tools, to permit those engaged in the building construction trade to work more rapidly and efficiently.

One of the more time-consuming tasks in the trade is the precise alignment, spacing, and fastening of construction members to construct a patio deck and/or a deck railing having multiple vertical spindles or slats.

Now, a deck installation device has been invented which will allow anyone to properly and efficiently align each deck plank in constructing a patio deck and to properly and efficiently align each vertical spindle or slat in constructing a deck railing.

SUMMARY OF THE PRESENT INVENTION

Briefly, this invention relates to a deck installation device and a method of using this device.

The deck installation device includes first, second and third members joined to form a unitary structure. The first member has a first end and a second end, a first side and a second side, a first surface and a second surface, a thickness measured between the first and second surfaces, a width measured between the first and second sides, and a length measured between the first and second ends. The second member has a first end and a second end, a first side and a second side, a first surface and a second surface, a thickness measured between the first and second surfaces, a width measured between the first and second sides, and a length measured between the first and second ends. The first end of the second member is secured to the first end of the first member and extends perpendicularly outward from the second surface of the first member. The third member has a first end and a second end, a first side and a second side, a first surface and a second surface, a thickness measured between the first and second surfaces, a width measured between the first and second sides, and a length measured between the first and second ends. The first end of the third member is secured to the second surface of the first member at a point located between the first and second ends of the first member. The third member extends perpendicularly outward from the second surface of the first member, and the third member has a length which is greater than the length of the second member. A pair of spaced apart holes are formed in the third member. Each of the pair of spaced apart holes extend from the first surface to the second surface. Each of the pair of spaced apart holes is aligned on a central axis located midway between the first and second sides, and each of the pair of holes has a diameter large enough to allow a fastener to pass therethrough.

In another embodiment, the deck installation device includes first, second and third members joined to form a unitary structure. The first member has a first end and a second end, a first side and a second side, a first surface and a second surface, a thickness measured between the first and second surfaces, a width measured between the first and second sides, and a length measured between the first and second ends. The second member has a first end and a second end, a first side and a second side, a first surface and a second surface, a thickness measured between the first and second surfaces, a width measured between the first and second sides, and a length measured between the first and second ends, and the first end of the second member is secured to the first end of the first member and extends perpendicularly outward from the second surface of the first member. The third member has a first end and a second end, a first side and a second side, a first surface and a second surface, a thickness measured between the first and second surfaces, a width measured between the first and second sides, and a length measured between the first and second ends. The first end of the third member is secured to the second surface of the first member at a point located between the first and second ends of the first member. The third member extends perpendicularly outward from the second surface of the first member, and the third member has a length which is greater than the length of the second member. A pair of spaced apart holes is formed in the third member. Each of the pair of holes extend from the first surface to the second surface. Each of the pair of holes is aligned on a central axis located midway between the first and second sides, and each of the pair of holes has a diameter large enough to allow a fastener to pass therethrough. Lastly, the deck installation device has a pair of spaced apart protrusions formed on the first surface of the third member. Each of the pair of protrusions extends perpendicularly toward the first member from the second end of the third member. Each of the pair of protrusions has a length of at least 0.25 inches, and each of the pair of protrusions is located an equal distance from the central axis of the pair of holes.

In a third embodiment, a method of using the deck installation device to insure proper spacing and alignment of deck boards on supporting joists is taught. The deck installation device including a first member having a first end and a second end, a first side and a second side, a first surface and a second surface, a thickness measured between the first and second surfaces, a width measured between the first and second sides, and a length measured between the first and second ends; a second member having a first end and a second end, a first side and a second side, a first surface and a second surface, a thickness measured between the first and second surfaces, a width measured between the first and second sides, and a length measured between the first and second ends, and the first end of the second member is secured to the first end of the first member and extends perpendicularly outward from the second surface of the first member; a third member having a first end and a second end, a first side and a second side, a first surface and a second surface, a thickness measured between the first and second surfaces, a width measured between the first and second sides, and a length measured between the first and second ends. The first end of the third member is secured to the second surface of the first member at a point located between the first and second ends of the first member. The third member extends perpendicularly outward from the second surface of the first member, and the third member has a length which is greater than the length of the second member. A pair of spaced apart holes is formed in the third member. Each of the pair of holes extend from the first surface to the second surface. Each of the pair of holes is aligned on a central axis located midway between the first and second sides, and each of the pair of holes has a diameter large enough to allow a fastener to pass therethrough. Lastly, a pair of spaced apart protrusions is formed on the first surface of the third member and each of the pair of protrusions extend perpendicularly toward the first member from the second end of the third member. Each of the pair of protrusions has a length of at least about 0.25 inches, and each of the pair of protrusions is located an equal distance from the central axis of the pair of holes. The method includes the steps of securing a first deck board perpendicularly across a plurality of support joists. The first deck board having an elongated outer side edge against which a second deck board can to be positioned at a predetermined distance. The second end of the first member of the deck installation device is positioned adjacent to the elongated outer side edge of the first deck board such that the third member of the deck installation device is aligned above one of the support joists. The thickness of the first member insuring that the second deck board is positioned at a predetermined distance from the elongated outer side edge of the first board. The second deck board is secured to the support joist by inserting a fastener through each of the pair of spaced apart holes. The second end of the first member of the deck installation device is slid adjacent to the elongated outer side edge of the first deck board such that the third member of the deck installation device is aligned above an adjacent second support joist. The second deck board is secured to the second support joist by inserting fasteners through each of the pair of spaced apart holes. The steps b-e are then repeated until the second deck board is secured to all support joists. The deck installation device is then removed. The second deck board having an elongated outer side edge against which a third deck board can be positioned at a predetermined distance. The second end of the first member of the deck installation device is positioned adjacent to the elongated outer side edge of the second deck board such that the third member of the deck installation device is aligned above one of the support joists. The thickness of the first member ensures that the third deck board is positioned at a predetermined distance from the elongated outer side edge of the second deck board. Steps b-h are then repeated until the deck is constructed.

This invention aids to provide a deck installation device to properly and efficiently align deck boards in constructing a patio deck, and properly and efficiently align deck spindles or slats in constructing a deck railing. More specifically this invention aids to provide a deck installation device which is a unitary member which can be maneuvered with one hand.

Further, this invention aids to provide an inexpensive deck installation device which can be used by anyone to properly align and fasten deck boards onto joists when constructing a patio deck, and to properly align and fasten spindles or slats when constructing a deck railing.

Still further, this invention aids to provide a method of using a deck installation device which serves as a guide for the proper and precise spacing and location of fasteners, such as screw or nails, or other fasteners, when constructing a deck and a deck railing.

Still further, this invention aids to provide an easy to use deck installation device which can be easily cleaned after use.

Other advantages of the present invention will become more apparent to those skilled in the art in view of the following description and the accompanying drawings.

DETAILED DESCRIPTIONS OF THE INVENTION

Figure 1:
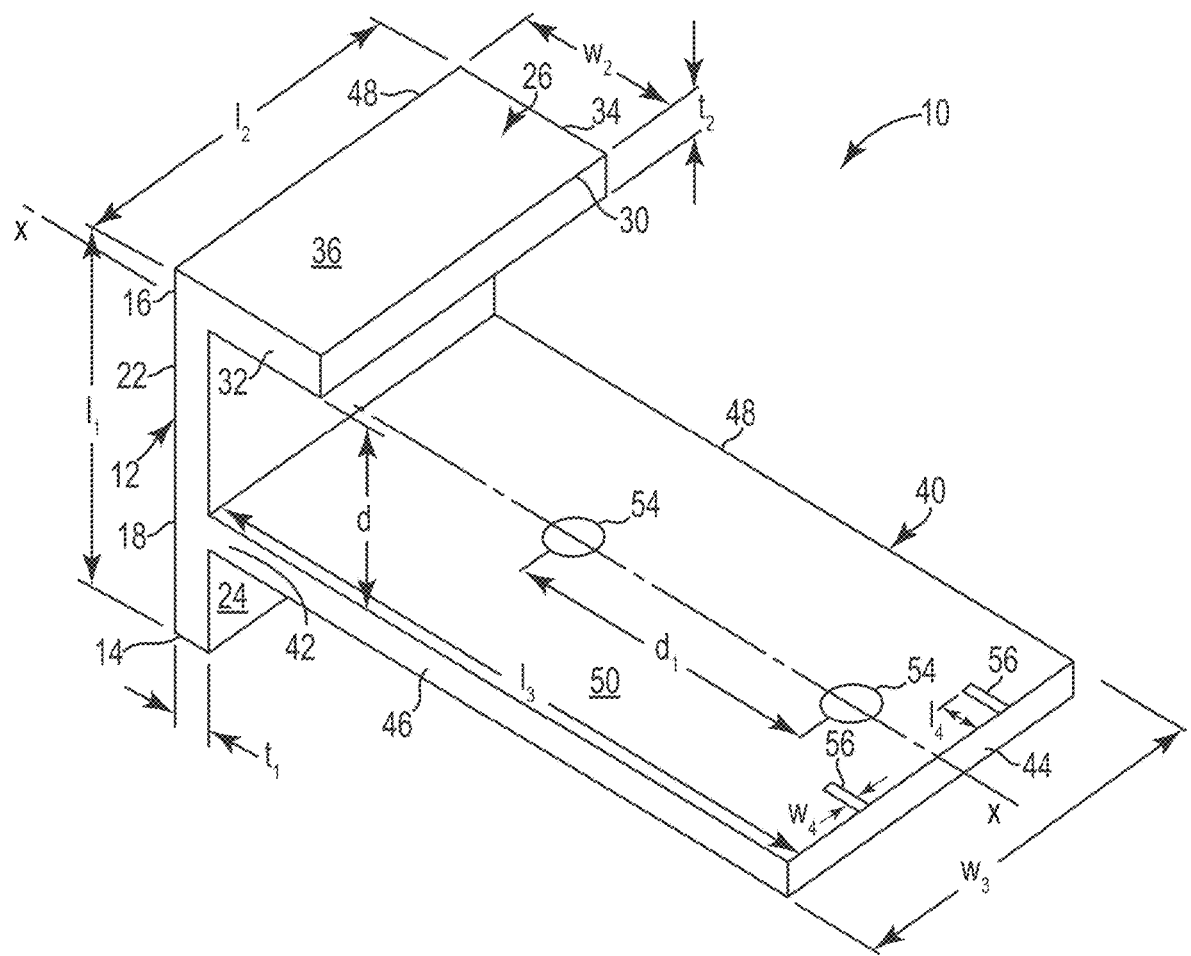
FIG. 1 is a perspective view of a deck installation device.

Referring to FIGS. 1-5, a deck installation device 10 is shown which is a unitary and/or an integral member. By "unitary" it is meant forming a single or uniform entity. By "integral" it is meant a complete unit, a whole. The deck installation device 10 includes a first member 12. The first member 12 can be formed from a variety of materials. The first member 12 can be formed from a plastic, a thermoplastic, a composite material, fiberglass, or a combination of two or more materials. By "plastic" it is meant a material of various organic compounds produced by polymerization and capable of being molded, extruded, cast into shapes and films, or drawn into filaments used as textile fibers. By 'thermoplastic" it is meant a material becoming soft when heated and hard when cooled. Alternatively, the first member 12 can be formed from wood, a metal, an alloy, a ferrous material, a non-ferrous material, or a combination of two or more materials. By "ferrous" it is meant of or relating to, or containing iron, especially with valence 2 or a valence lower than in a corresponding ferric compound. By "non-ferrous" it is meant a metal other than iron or steel. Desirably, the first member 12 is formed or molded from a plastic or a thermoplastic.

The first member 12 has a first end 14 and a second end 16. The first end 14 is spaced apart from the second end 16. The distance between the first and second ends, 12 and 14 respectively, can vary. The distance between the first and second ends, 12 and 14 equate to the length $l_1$ of the first member 12. The length $l_1$ of the first member 12 can vary in dimension. The length $l_1$ of the first member 12 can range from between about 2.5 inches to about 3.5 inches. Desirably, the length $l_1$ of the first member 12 can range from between about 2.6 inches to about 3.2 inches. More desirably, the length $l_1$ of the first member 12 can range from between about 2.7 inches to about 3.1 inches. More desirably, the length $l_1$ of the first member 12 can range from between about 2.8 inches to about 3 inches. Most desirably, the length $l_1$ of the first member 12 is about 2.875 inches.

Figure 4:
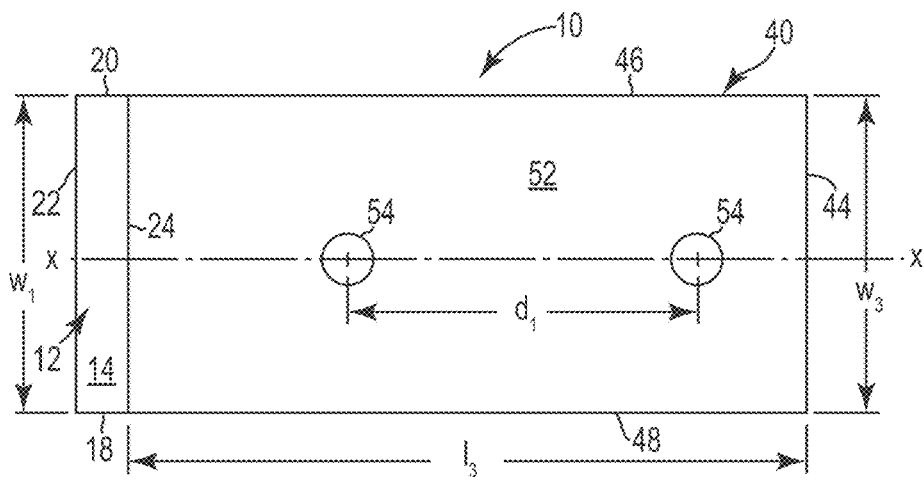
FIG. 4 is a bottom view of the deck installation device shown in FIG. 1.

Referring now to FIGS. 1 and 4, the first member 12 also has a first side 18 and a second side 20. The first side 18 is spaced apart from the second side 20. The distance between the first and second sides, 18 and 20 equate to the width $w_1$ of the first member 12. The width $w_1$ of the first member 12 can vary in dimension. The width $w_1$ of the first member 12 can range from between about 3 inches to about 4 inches. Desirably, the width $w_1$ of the first member 12 can range from between about 3.1 inches to about 3.9 inches. More desirably, the width $w_1$ of the first member 12 can range from between about 3.2 inches to about 3.8 inches. Even more desirably, the width $w_1$ of the first member 12 can range from between about 3.4 inches to about 3.7 inches. Most desirably, the width $w_1$ of the first member 12 is about 3.5 inches.

The first member 12 further has a first surface 22 and a second surface 24. The first surface 22 is spaced apart from the second surface 24. The first and second surfaces, 22 and 24 respectively, can be planar in appearance, can have a smooth or rough appearance, contain one or more ribs to add strength, or have some other configuration. By "planar" it is meant relating to or in the form of a plane. The distance between the first and second surfaces, 22 and 24 respectively equate to the thickness $t_1$ of the first member 12. The thickness $t_1$ of the first member 12 can vary in dimension. The thickness $t_1$ of the first member 12 can range from between about 0.1 inches to about 0.4 inches. Desirably, the thickness $t_1$ of the first member 12 can range from between about 0.15 inches to about 0.35 inches. More desirably, the thickness $t_1$ of the first member 12 can range from between about 0.18 inches to about 0.37 inches. Even more desirably, the thickness $t_1$ of the first member 12 can range from between about 0.2 inches to about 0.3 inches. Most desirably, the thickness $t_1$ of the first member 12 is about 0.25 inches.

Referring again to FIGS. 1-5, the deck installation device 10 also includes a second member 26. The second member 26 can be formed from a variety of materials. The second member 26 can be formed from the same material which is used to form the first member 12 or it can be formed from a different material. Desirable, the first and second members, 12 and 26 respectively, are formed from the same material. More desirably, the first and second members, 12 and 26 respectively, are formed from plastic or a thermoplastic material. The first and second members, 12 and 26 can be molded together.

The second member 26 has a first end 28 and a second end 30. The first end 28 of the second member 26 is secured to the first end 14 of the first member 12 and extends perpendicularly outward from the second surface 24 of the first member 12. As mentioned above, the second member 26 can be molded to the first member 12. The first end 28 is spaced apart from the second end 30. The distance between the first and second ends, 28 and 30 respectively, can vary. The distance between the first and second ends, 28 and 30 equate to the length $l_2$ of the second member 26. The length $l_2$ of the second member 26 can vary in dimension. The length $l_2$ of the second member 26 can range from between about 3 inches to about 4 inches. Desirably, the length $l_2$ of the second member 26 can range from between about 3.1 inches to about 3.9 inches. More desirably, the length $l_2$ of the second member 26 can range from between about 3.2 inches to about 3.8 inches. More desirably, the length $l_2$ of the second member 26 can range from between about 3.4 inches to about 3.7 inches. Most desirably, the length $l_2$ of the second member 26 is about 3.5 inches.

It should be noted that the length $l_1$ of the first member 12 is greater than the length $l_2$ of the second member 26.

Referring now to FIGS. 1 and 4, the second member 26 also has a first side 32 and a second side 34. The first side 32 is spaced apart from the second side 34. The distance between the first and second sides, 32 and 34 equate to the width $w_2$ of the second member 26. The width $w_2$ of the second member 26 can vary in dimension. The width $w_2$ of the second member 26 can range from between about 1 inches to about 3 inches. Desirably, the width $w_2$ of the second member 26 can range from between about 1.25 inches to about 2.5 inches. More desirably, the width $w_2$ of the second member 26 can range from between about 1.3 inches to about 2 inches. Even more desirably, the width $w_2$ of the second member 26 can range from between about 1.4 inches to about 1.8 inches. Most desirably, the width $w_2$ of the second member 26 is about 1.5 inches.

The second member 26 further has a first surface 36 and a second surface 38. The first surface 36 is spaced apart from the second surface 38. The first and second surfaces, 36 and 38 respectively, can be planar in appearance, can have a smooth or rough appearance, contain one or more ribs to add strength, or have some other configuration. By "planar" it is meant relating to or in the form of a plane. The distance between the first and second surfaces, 36 and 38 respectively equate to the thickness $t_2$ of the second member 26. The thickness $t_2$ of the second member 12 can vary in dimension. The thickness $t_2$ of the second member 26 can range from between about 0.1 inches to about 0.4 inches. Desirably, the thickness $t_2$ of the second member 26 can range from between about 0.15 inches to about 0.35 inches. More desirably, the thickness $t_2$ of the second member 26 can range from between about 0.18 inches to about 0.37 inches. Even more desirably, the thickness $t_2$ of the second member 26 can range from between about 0.2 inches to about 0.3 inches. Most desirably, the thickness $t_2$ of the second member 26 is about 0.25 inches.

It should be noted that the thickness $t_2$ of the second member 26 can be equal to the thickness $t_1$ of the first member 12.

Referring again to FIGS. 1-5, the deck installation device 10 also includes a third member 40. The third member 40 can be formed from a variety of materials. The third member 40 can be formed from a similar or identical material as was used to form the first member 12 and the second member 26. Alternatively, the third member 40 could be formed from a material which is different from either the first member 12 and/or the second member 26. Desirable, the first, second and third members, 12, 26 and 40 respectively, are formed from the same material. More desirably, the first, second and third members, 12, 26 and 40 respectively, are formed from plastic or a thermoplastic material. Most desirably, the first, second and third members, 12, 26 and 40 respectively, are molded together using any of the molding techniques known to those in the plastic industry.

The third member 40 has a first end 42 and a second end 44. The first end 42 of the third member 40 is secured to the second surface 24 of the first member 12 at a point located between the first and second ends, 14 and 16 respectively, of the first member 12 and extends perpendicularly outward from the second surface 24 of the first member 12. The first end 42 is spaced apart from the second end 44. The distance between the first and second ends, 42 and 44 respectively, can vary. The distance between the first and second ends, 42 and 44 equate to the length $l_3$ of the third member 40. The length $l_3$ of the third member 40 can vary in dimension. The length $l_3$ of the third member 40 can range from between about 4 inches to about 7 inches. Desirably, the length $l_3$ of the third member 40 can range from between about 4.5 inches to about 6.5 inches. More desirably, the length $l_3$ of the third member 40 can range from between about 5 inches to about 6 inches. More desirably, the length $l_3$ of the third member 40 can range from between about 5.2 inches to about 5.7 inches. Most desirably, the length $l_3$ of the third member 40 is about 5.75 inches. The length $l_3$ of the third member 40 is greater than the length $l_2$ of the second member 26. Desirably, the length $l_3$ of the third member 40 is at least twice the length $l_2$ of the second member 26. More desirably, length $l_3$ of the third member 40 is at least three times the length $l_2$ of the second member 26.

The length $l_3$ of the third member 40 is greater than the length $l_2$ of the second member 26. The length $l_3$ of the third member 40 is also greater than the length $l_1$ of the first member 12.

Referring now to FIGS. 1 and 4, the third member 40 also has a first side 46 and a second side 48. The first side 46 is spaced apart from the second side 48. The distance between the first and second sides, 46 and 48 equate to the width $w_3$ of the third member 40. The width $w_3$ of the third member 40 can vary in dimension. The width $w_3$ of the third member 40 can range from between about 1 inches to about 3 inches. Desirably, the width $w_3$ of the third member 40 can range from between about 1.25 inches to about 2.5 inches. More desirably, the width $w_3$ of the third member 40 can range from between about 1.3 inches to about 2 inches. Even more desirably, the width $w_3$ of the third member 40 can range from between about 1.4 inches to about 1.8 inches. Most desirably, the width $w_3$ of the third member 40 is about 1.5 inches.

The third member 40 further has a first surface 50 and a second surface 52. The first surface 50 is spaced apart from the second surface 52. The first and second surfaces, 50 and 52 respectively, can be planar in appearance, can have a smooth or rough appearance, contain one or more ribs to add strength, or have some other configuration. By "planar" it is meant relating to or in the form of a plane. The distance between the first and second surfaces, 50 and 52 respectively equate to the thickness $t_3$ of the third member 40. The thickness $t_3$ of the third member 40 can vary in dimension. The thickness $t_3$ of the third member 40 can range from between about 0.1 inches to about 0.4 inches. Desirably, the thickness $t_3$ of the third member 40 can range from between about 0.15 inches to about 0.35 inches. More desirably, the thickness $t_3$ of the third member 40 can range from between about 0.18 inches to about 0.37 inches. Even more desirably, the thickness $t_3$ of the third member 40 can range from between about 0.2 inches to about 0.3 inches. Most desirably, the thickness $t_3$ of the third member 40 is about 0.25 inches.

It should be understood that the thickness $t_1$ of the first member 12 can be less than, be equal to, or be greater than the thickness $t_2$ of the second member 26. Likewise, the thickness $t_2$ of the second member 26 can be less than, be equal to, or be greater than the thickness $t_3$ of the third member 40. Desirably, the thicknesses $t_1$, $t_2$ and $t_3$ of the first, second and third members, 12, 26 and 40 respectively, are the same.

Figure 2:
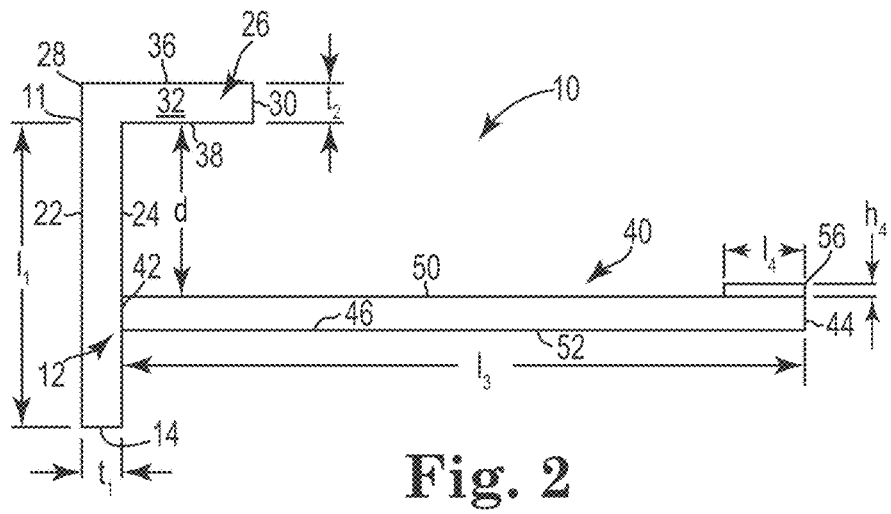
FIG. 2 is a side view of the deck installation device shown in FIG. 1.

Referring now to FIGS. 1 and 2, the third member 40 is spaced apart from the second member 26 by a distance d. The distance d the third member 40 is spaced apart from the second member 26 can vary. The distance d can range from between about 0.5 inches to about 3 inches. Desirably, the distance d the third member 40 is spaced apart from the second member 26 ranges from between about 1 inch to about 2.5 inches. More desirably, the distance d the third member 40 is spaced apart from the second member 26 ranges from between about 1.25 inches to about 2 inches. Even more desirably, the distance d the third member 40 is spaced apart from the second member 26 ranges from between about 1.4 inches to about 1.8 inches. Most desirably, the distance d the third member 40 is spaced apart from the second member 26 is about 1.625 inches.

Figure 3:
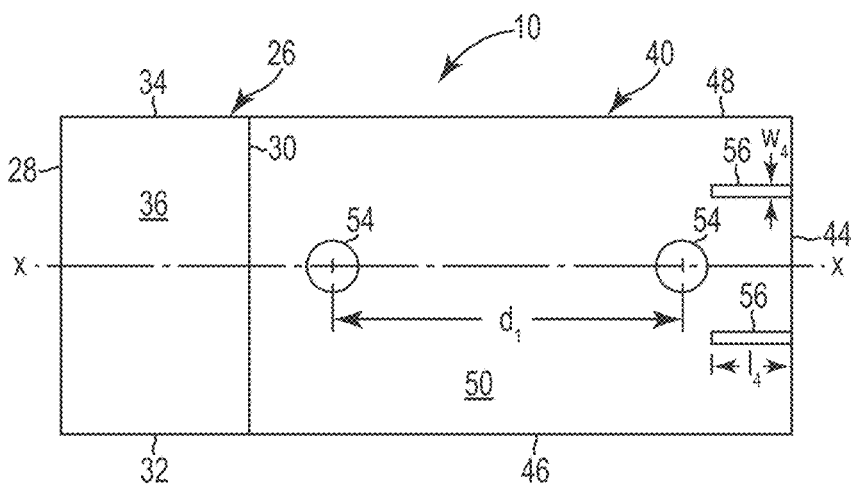
FIG. 3 is a top view of the deck installation device shown in FIG. 1.

Referring now to FIGS. 1, 3 and 4, the deck installation device 10 also includes a pair of spaced apart holes 54, 54 each of which is formed through the third member 40. Each of the pair of holes 54, 54 extends from the first surface 50 of the third member 40 to the second surface 52 of the third member 40. Each of the pair of holes 54, 54 is aligned on a central axis X-X located midway between the first and second sides, 46 and 48 of the third member 40. Each of the pair of holes 54, 54 has a diameter which is large enough or of sufficient size to allow a fastener to pass therethrough. The fastener can be a screw having an enlarged head, a nail having an enlarged head, or some other kind of fastener known to those skilled in the fastener art which may or may not have an enlarged head.

Each of the pair of holes 54, 54 will have a diameter of at least: about 0.25 inches, about 0.3 inches, about 0.35 inches, about 0.4 inches, about 0.45 inches, about 0.5 inches or larger. Desirably, each of the pair of holes 54, 54 will have a diameter of at least about 0.3 inches. More desirably, each of the pair of holes 54, 54 will have a diameter of at least about 0.4 inches. Even more desirably, each of the pair of holes 54, 54 will have a diameter of at least about 0.5 inches. In addition, each of the pair of holes 54, 54 should be spaced apart from one another by a distance $d_1$. The distance $d_1$ is measured from the center of one hole 54 to the center of the other hole 54. The distance $d_1$ can vary. The distance $d_1$ can range from between about 1 inch to about 4.5 inches. Desirably, the distance $d_1$ ranges from between about 2 inches to about 4 inches. More desirably, the distance $d_1$ ranges from between about 3 inches to about 3.75 inches. Even more desirably, the distance $d_1$ ranges from between about 3 inches to about 3.5 inches. Most desirably, the distance $d_1$ is about 3.25 inches.

Referring to FIGS. 1-3 and 5, the deck installation device 10 has a pair of spaced apart visual indicators 56, 56. Each of the pair of visual indicators 56, 56 is present on the first surface 50 of the third member 40. Alternatively, each of the pair of visual indicators 56, 56 can be formed in the third member 40. Each of the pair of visual indicators 56, 56 extend perpendicular from the second end 44 of the third member 40 toward the first member 12. The pair of visual indicators 56, 56 can vary in shape and configuration. For example, the pair of visual indicators can be: a pair of spaced apart marks, a pair of spaced apart linear lines, a pair of spaced apart highlighted lines, a pair of spaced apart protrusion, a pair of spaced apart raised dots, a pair of spaced apart cuts, a pair of spaced apart grooves, a pair of spaced apart indentations, etc. By "protrusion" it is meant something that protrudes; a protuberance. The pair of visual indicators 56, 56 are depicted in the drawings as protrusions which extend upward from the first surface 50 of the third member 40.

Figure 5:
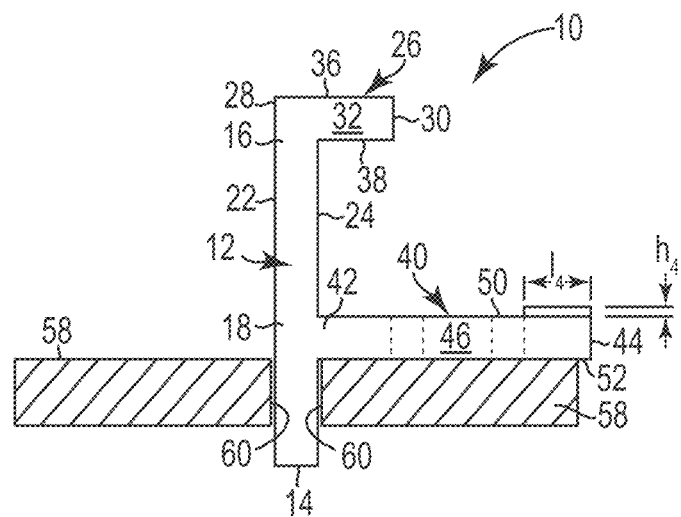
FIG. 5 is a side view of the deck installation device with the first member inserted between two deck boards to impart a predetermined distance therebetween.

Referring to FIGS. 1, 2 and 5, each of the pair of visual indicators 56, 56 has length $l_4$. The length $l_4$ of each pair of visual indicators 56, 56 is measured parallel to the length $l_3$ of the third member 40. The length $l_4$ of each pair of visual indicators 56, 56 can vary in dimension. The length $l_4$ of each pair of visual indicators 56, 56 can range from between about 0.1 inches to about 1 inch. Desirably, the length $l_4$ of each pair of visual indicators 56, 56 can range from between about 0.15 inches to about 0.75 inches. More desirably, the length $l_4$ of each pair of visual indicators 56, 56 can range from between about 0.2 inches to about 0.5 inches. Even more desirably, the length $l_4$ of each pair of visual indicators 56, 56 can range from between about 0.25 inches to about 0.4 inches. Most desirably, the length $l_4$ of each pair of visual indicators 56, 56 should be at least 0.25 inches in dimension.

It should be noted that each of the pair of visual indicators 56, 56 should have the same length $l_4$.

Each of the pair of visual indicators 56, 56 also has a width $w_4$. The width $w_4$ of each pair of visual indicators 56, 56 is measured perpendicular to the length $l_3$ of the third member 40. The width $w_4$ of each pair of visual indicators 56, 56 can range from between about 0.01 inches to about 0.1 inches.

Referring to FIGS. 2 and 5, when the pair of visual indicators 56, 56 are constructed as protrusions or raised dots, each of the pair of visual indicators 56, 56 has a height $h_4$ which can vary in dimension. The height $h_4$ can range from between about 0.01 inches to about 0.1 inches.

The pair of visual indicators 56, 56 are either present on the first surface of the third member 40 or are formed on or into the third member 40. The pair of visual indicators 56, 56 are located an equal distance from the central axis X-X which passes through the pair of holes 54, 54.

Figure 9:
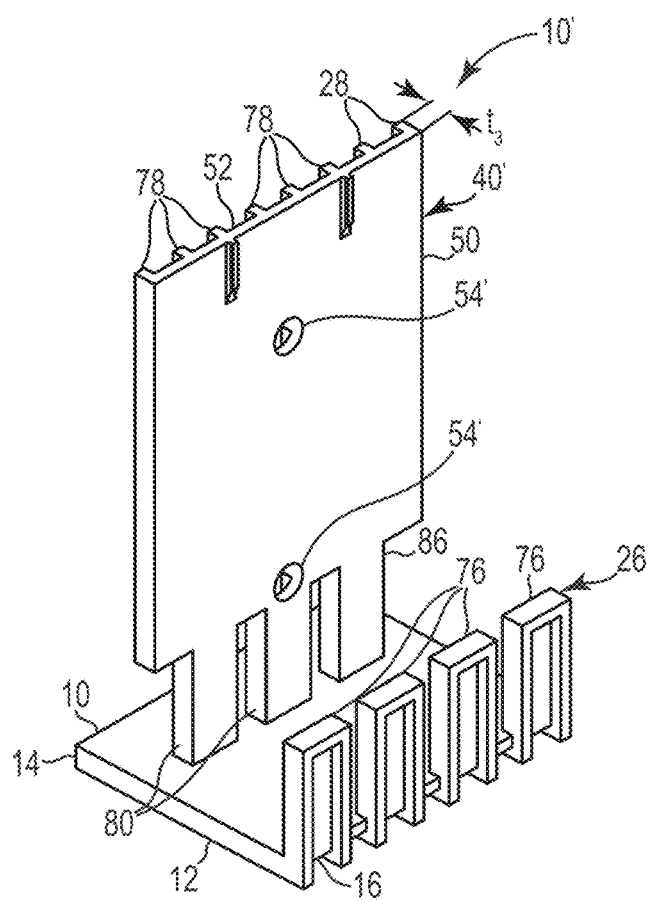
FIG. 9 is a perspective view of an alternative embodiment showing the second and third members having a unique configuration.

Referring to FIG. 9, an alternative deck installation device 10' is shown which can be molded from plastic or from a thermoplastic material. One can see that the deck installation device 10' is similar to the deck installation device 10 except that the second and third members, 26' and 40' respectively, have a different size, shape and configuration. The second member 26' consist of four upwardly extending legs 76, 76, 76 and 76. Each leg 76 can be secured or molded to the second end 16 of the first member 12. Each of the four upwardly extending legs 76, 76, 76 and 76 have a rectangular configuration with a space separating each one. It should be noted that any number of legs 76 could be utilized.

The third member 40' also differs from the third member 40 in that it contains a plurality of ribs 78 formed on the second surface 52. The number of ribs 78 can vary. The ribs 78 add strength to the third member 40' and therefore allow the third member 40' to be constructed with less material while still having the required thickness $t_3$. The third member 40' also is secured to the second surface 24 of the first member 12 by three legs 80, 80 and 80. Each of the three upwardly extending legs 80, 80 and 80 have a rectangular configuration with a space separating each one. It should be noted that any number of legs 80 could be utilized. The use of the three legs 80, 80 and 80 also decreases the amount of material needed to construct the third member 40'.

METHOD

With referring to FIGS. 5-8, two different methods of using the deck installation device 10 will now be explained with reference to building a deck, and to building a railing for the deck. In building a deck, such as a patio deck, it is important that the elongated deck boards 58, 58 be equally spaced apart from one another. The elongated deck boards 58, 58 can vary in length. Usually, the deck boards are about 8 feet in length or longer and have a width of about 6 inches to about 10 inches. The deck boards 58, 58 are horizontally arranged and are not abutted against one another but instead are separated from each other by a predetermined distance. This distance is typically about 0.25 inches. This distance allows water, sleet or snow, which may accumulate on the horizontal deck boards 58, 58, to drain from the deck.

Figure 6:
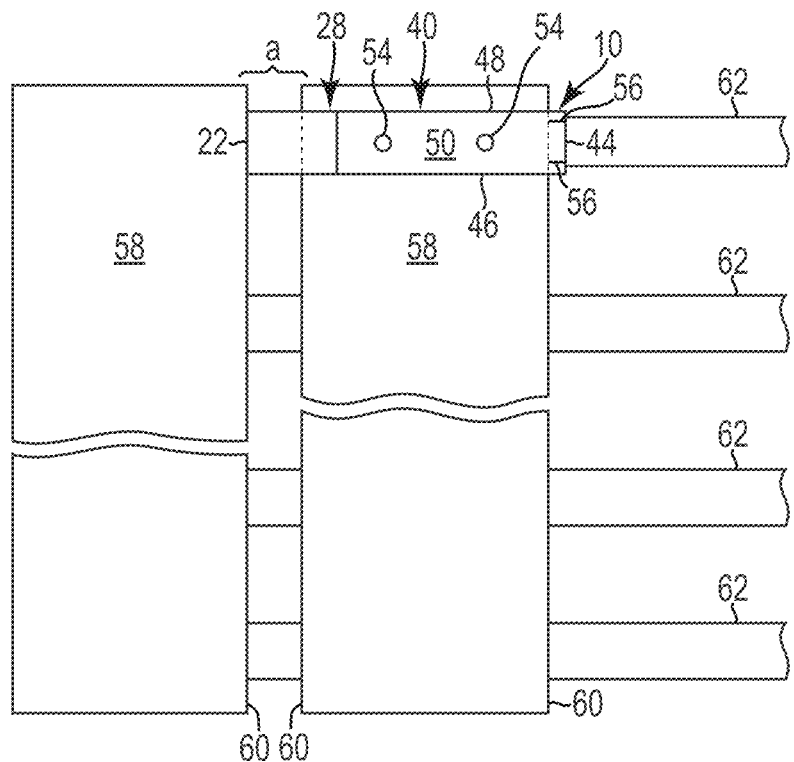
FIG. 6 is a top view of the deck installation device positioned above two deck boards and aligned with a support joist.

Referring to FIGS. 5 and 6, a method of constructing a deck, such as a patio deck, includes securing a first deck board 58 perpendicularly across a plurality of support joists 62, 62. Multiple support joists 62, 62 are aligned perpendicular to the deck boards 58, 58. Local building codes can dictate the required spacing needed between the adjacent support joists 62, 62. Typically, the support joists 62, 62 are spaced 16 inches, 18 inches, 20 inches, or 22 inches apart. The first deck board 58 has an outer side edge 60 against which a second deck board 58 can be positioned at a predetermined distance. Each of the elongated deck boards 58, 58 can be secured to the underlying support joists 62, 62 by fasteners known to those skilled in the art. Typical fasteners include but are not limited to: screws, nails, bolts and nuts, pegs, pins, staples, etc. Once the first deck board 58 is fastened adjacent to the structure to which the deck is to be attached, the first member 12 of the deck installation device 10 is positioned adjacent to the outer side edge 60 of the first deck board 58. A second deck board 58 is then abutted against the deck installation device 10. The deck installation device 10 should be aligned parallel to one of the support joists 60 at this time. The first member 12 of the deck installation device 10 has a thickness of about 0.25 inches. This distance determines the spacing between adjacent horizontal deck boards. 58, 58. The first end 14 of the first member 12 is positioned adjacent to the outer side edge 60 of a first deck board 58 which has been secured to the underlying support joists 62, 62, see FIG. 6.

The deck installation device 10 is positioned such that the third member 40 of the deck installation device 10 is aligned above one of the support joists 62, 62. The thickness $t_1$ of the first member 12 ensures that the second deck board 58 is positioned at a predetermined distance from the elongated outer side edge 60 of the first deck board 58. The pair of visual indicators 56, 56 will assist in properly aligning the deck installation device 10 over each support joist 62. The second deck board 58 is then secured to a first support joist 62 by inserting a pair of fasteners (not shown) through each of the pair of spaced apart holes 54, 54. The deck installation device 10 is then slid horizontally along the elongated outer side edge 60 of the first deck board 58 to the next support joist 60. Here, a pair of additional fasteners are inserted through the pair of holes 54, 54 to secure the second deck board 58 to the second support joist 62. This action is repeated until the second deck board 58 is secured to each of the underlying support joists 62, 62. The deck installation device 10 is then removed.

The second deck board 58 also has an elongated outer side edge 60 against which a third deck board 58 can be positioned at a predetermined distance. The first end 12 of the first member 12 of the deck installation device 10 is positioned adjacent to the elongated outer side edge 60 of the second deck board 58, such that the third member 40 of the deck installation device 10 is aligned above one of the support joists 62, 62. The thickness $t_1$ of the first member 12 ensures that the third deck board 58 is positioned at a predetermined distance from the elongated outer side edge 60 of the second deck board 58. A pair of fasteners (not shown) are used to secure the third deck board 58 to the underlying first support joist 62. The deck installation device 10 is then slid along the outer side edge 60 of the third deck board 58 to the next support joist 62 where another pair of fasteners are inserted through the pair of holes 54, 54 to secure the third deck board 58 in place. This action is repeated until the third deck board 58 is secured to each of the underlying support joists 62, 62. The deck installation device 10 is then removed. The above steps are repeated until construction of the deck is completed.

Figure 7:
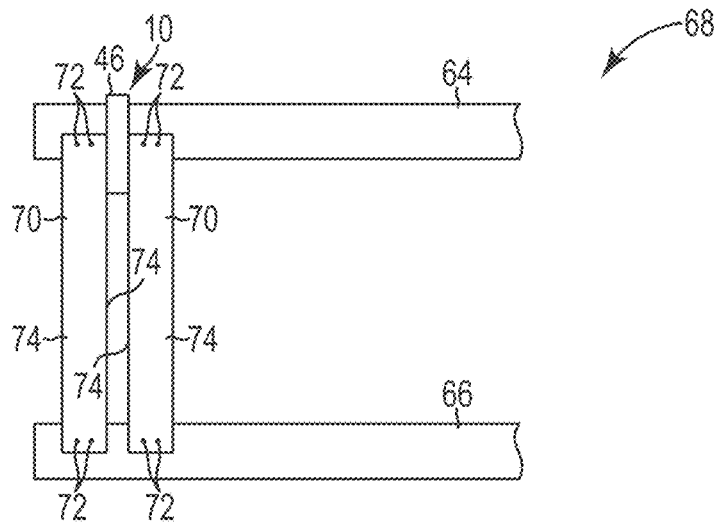
FIG. 7 is a front view of a deck railing showing a top rail and a spaced apart bottom rail and two vertical spindles secured to the top and bottom rails with the deck installation device positioned between the two vertical spindles to ensure they are properly spaced a set distance apart.
Figure 8:
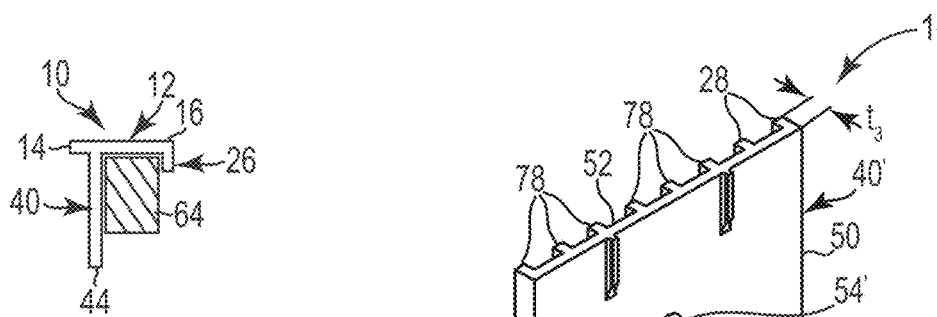
FIG. 8 is a side view of the deck installation device positioned over the top rail shown in FIG. 6.

A method of securing spindles (also referred to as a slats) 70, 70 to both a top deck railing 64 and to a lower positioned, bottom deck railing 66 in order to construct a deck railing 68 will now be explained. Referring to FIGS. 7 and 8, a first spindle 70 is secured between a top deck railing 64 and a bottom deck railing 66 using one or more fasteners 72, 72. Each spindle or slat 70 can be secured using any kind of fasteners 72 known to those skilled in the art. Typical fasteners 72 include but are not limited to: screws, nails, bolts and nuts, pegs, pins, staples, etc. The first spindle 70 is normally aligned in a vertical fashion, such that it is aligned perpendicular to the top deck railing 64 and perpendicular to the bottom deck railing 66. Alternatively, the spindles or slats 70, 70 could be aligned at an angle other than 90 degrees to the top and bottom deck railings, 64 and 66 respectively. Each spindle or slat 70 has a pair of elongated outer side edges 74, 74.

Referring to FIG. 8, the second surface 24 of the first member 12, of the deck installation device 10, is positioned on the top deck railing 64 with the second side 48 of the third member 40 contacting the outer elongated, outer side edge 74 of the first spindle 70. The deck installation device 10 simply hangs downward from the top deck railing. A second spindle 70 is positioned adjacent to the deck installation device 10 such that it contacts the first side 46 of the third member 40. The width $w_3$ of the third member 40 creates the predetermined spaced between the two spindles 70, 70. The second spindle 70 is then secured to the top and bottom deck railings, 64 and 66 respectively. The second spindle 70 also has a pair of elongated, outer side edges 74, 74. The deck installing device 10 is removed once the second spindle is secure. The deck installing device 10 is then positioned adjacent to the outer side edge 74 of the second spindle 70 and a third spindle 70 is positioned adjacent to the first side 46 of the third member 40. The third spindle 70 is secured by fasteners 72, 72 to both the top and bottom deck railings, 64 and 66 respectively. Once the third spindle 70 is secure, the deck installation device 10 is removed.

The deck installation device 10 can then be positioned on the top deck railing 64, with the second side 48 of the third member 40, of the deck installation device 10, contacting the elongated, outer side edge 74 of the third spindle 70. A fourth spindle 70 can be positioned adjacent to the first side 46 of the third member 40, of the deck installation device 10 and the fourth spindle 70 can be secured to both the top and bottom deck railings 64 and 66 respectively. The fourth spindle 70 has a pair of elongated, outer side edges 74, 74. Once the fourth spindle 70 is secure, the deck installation device 10 is removed. The above steps are repeated for subsequent spindles 70, 70 until the deck railing 68 is completely constructed.

While the invention has been described in conjunction with two different embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A deck installation device comprising:
    a) a first member having a first end and a second end, a first side and a second side, a first surface and a second surface, a thickness measured between said first and second surfaces, a width measured between said first and second sides, and a length measured between said first and second ends;
    b) a second member having a first end and a second end, a first side and a second side, a first surface and a second surface, a thickness measured between said first and second surfaces, a width measured between said first and second sides, and a length measured between said first and second ends, and said first end of said second member secured to said first end of said first member and extending perpendicularly outward from said second surface of said first member;
    c) a third member having a first end and a second end, a first side and a second side, a first surface and a second surface, a thickness measured between said first and second surfaces, a width measured between said first and second sides, and a length measured between said first and second ends, said first end of said third member secured to said second surface of said first member at a point located between said first and second ends of said first member, said third member extending perpendicularly outward from said second surface of said first member, and said third member having a length which is greater than said length of said second member; and
    d) a pair of spaced apart holes formed in said third member, each of said pair of holes extending from said first surface to said second surface, each of said pair of holes aligned on a central axis located midway between said first and second sides, and each of said pair of holes having a diameter large enough to allow a fastener to pass therethrough.

2. The deck installation device of claim 1 wherein said first, second and third members form a unitary device.

3. The deck installation device of claim 1 wherein said first, second and third members are formed from a plastic, a thermoplastic or a composite material.

4. The deck installation device of claim 1 wherein said first member has a length which is greater than the length of said second member.

5. The deck installation device of claim 1 wherein said first member has a thickness which is equal to the thickness of said second member.

6. The deck installation device of claim 1 wherein said third member has a length which is greater than the length of said second member.

7. The deck installation device of claim 5 wherein said third member has a length which is at least twice the length of said second member.

8. The deck installation device of claim 6 wherein said third member has a length which is at least three times the length of said second member.

9. The deck installation device of claim 1 wherein each of said pair of spaced apart holes have a diameter of at least about 0.3 inches, and said pair of holes are spaced apart by at least 2 inches as measured from center to center of each hole.

10. A deck installation device comprising:
    a) a first member having a first end and a second end, a first side and a second side, a first surface and a second surface, a thickness measured between said first and second surfaces, a width measured between said first and second sides, and a length measured between said first and second ends;

b) a second member having a first end and a second end, a first side and a second side, a first surface and a second surface, a thickness measured between said first and second surfaces, a width measured between said first and second sides, and a length measured between said first and second ends, and said first end of said second member secured to said first end of said first member and extending perpendicularly outward from said second surface of said first member;

c) a third member having a first end and a second end, a first side and a second side, a first surface and a second surface, a thickness measured between said first and second surfaces, a width measured between said first and second sides, and a length measured between said first and second ends, said first end of said third member secured to said second surface of said first member at a point located between said first and second ends of said first member, said third member extending perpendicularly outward from said second surface of said first member, and said third member having a length which is greater than said length of said second member;

d) a pair of spaced apart holes formed in said third member, each of said pair of holes extending from said first surface to said second surface, each of said pair of holes aligned on a central axis located midway between said first and second sides, and each of said pair of holes having a diameter large enough to allow a fastener to pass therethrough; and e) a pair of spaced apart visual indicators present on said first surface of said third member and each of said pair of visual indicators extending perpendicularly from said second end of said third member toward said first member, and each of said pair of visual indicators located an equal distance from said central axis of said pair of holes.

11. The deck installation device of claim 10 wherein each of said pair of spaced apart visual indicators has a length of from between about 0.1 inches to about 1 inch, measured parallel to said length of said third member, and a width of from between about 0.01 inches to about 0.1 inches, measured perpendicular to said length.

12. The deck installation device of claim 10 wherein each of said first, second and third members are planar members, said first member has a thickness which is equal to the thickness of said third member, and said pair of visual indicators are protrusions.

13. The deck installation device of claim 10 wherein said first, second and third members are formed from a plastic, a thermoplastic or a composite material and said pair of spaced apart visual indicators are spaced at least 1 inch apart.

14. The deck installation device of claim 10 wherein said first, second and third members are formed from a non-ferrous material.

15. The deck installation device of claim 10 wherein said first, second and third members are formed from a ferrous material.

16. The deck installation device of claim 10 wherein said first, second and third members form a unitary device.

17. A method of using a deck installation device to insuring proper spacing and alignment of deck boards on supporting joists, said deck installation device including a first member having a first end and a second end, a first side and a second side, a first surface and a second surface, a thickness measured between said first and second surfaces, a width measured between said first and second sides, and a length measured between said first and second ends; a second member having a first end and a second end, a first side and a second side, a first surface and a second surface, a thickness measured between said first and second surfaces, a width measured between said first and second sides, and a length measured between said first and second ends, and said first end of said second member secured to said first end of said first member and extending perpendicularly outward from said second surface of said first member; a third member having a first end and a second end, a first side and a second side, a first surface and a second surface, a thickness measured between said first and second surfaces, a width measured between said first and second sides, and a length measured between said first and second ends, said first end of said third member secured to said second surface of said first member at a point located between said first and second ends of said first member, said third member extending perpendicularly outward from said second surface of said first member, and said third member having a length which is greater than said length of said second member; a pair of spaced apart holes formed in said third member, each of said pair of holes extending from said first surface to said second surface, each of said pair of holes aligned on a central axis located midway between said first and second sides, and each of said pair of holes having a diameter large enough to allow a fastener to pass therethrough; and a pair of spaced apart protrusions formed on said first surface of said third member and each of said pair of protrusions extending perpendicularly toward said first member from said second end of said third member, each of said pair of protrusions having a length of at least about 0.25 inches, and each of said pair of protrusions is located an equal distance from said central axis of said pair of holes, said method comprising the steps of:

a) securing a first deck board perpendicularly across a plurality of underlying support joists, said first deck board having an elongated outer side edge against which a second deck board can to be positioned at a predetermined distance;

b) positioning said first end of said first member of said deck installation device adjacent to said elongated outer side edge of said first deck board such that said third member of said deck installation device is aligned above one of said support joists, the thickness of said first member insuring that said second board is positioned at a predetermined distance from said elongated outer side edge of said first deck board;

c) securing said second deck board to said support joist by inserting a pair of fasteners through said pair of spaced apart holes;

d) sliding said first end of said first member of said deck installation device adjacent to said elongated outer side edge of said first deck board such that said third member of said deck installation device is aligned above a second support joist;

e) securing said second deck board to said second support joist by inserting a pair of fasteners through said pair of spaced apart holes;

f) repeating steps c-e until said second deck board is secured to each underlying support joists;

g) removing said deck installation device, said second deck board having an elongated outer side edge against which a third deck board can be positioned at a predetermined distance;

h) positioning said first end of said first member of said deck installation device adjacent to said elongated outer side edge of said third deck board such that said third member of said deck installation device is aligned above one of said support joists, the thickness of said first member ensuring that said third deck board is positioned at a predetermined distance from said elongated outer side edge of said second deck board;

i) repeating the above steps until said deck is completed.

18. The method of claim 17 further comprising securing a first spindle vertically between a top deck railing and a spaced apart bottom deck railing, said first spindle having an elongated outer side edge; positioning said second surface of said first member of said deck installation device on said top deck railing with said second side of said third member of said deck installation device contacting said elongated outer side edge of said first spindle; positioning a second spindle adjacent to said first side of said third member of said deck installation device and securing said second spindle to said top deck railing and to said bottom deck railing, said second spindle having an elongated outer side edge; and removing said deck installing device.

19. The method of claim 18 further comprising positioning said second surface of said first member of said deck installation device on said top deck railing with said second side of said third member of said deck installation device contacting said elongated outer side edge of said second spindle; positioning a third spindle adjacent to said first side of said third member of said deck installation device and securing said third spindle to said top deck railing and to said bottom deck railing, said third spindle having an elongated outer side edge; and removing said deck installing device.

20. The method of claim 19 further comprising positioning said second surface of said first member of said deck installation device on said top deck railing with said second side of said third member of said deck installation device contacting said elongated outer side edge of said third spindle; positioning a fourth spindle adjacent to said first side of said third member of said deck installation device and securing said fourth spindle to said top deck railing and to said bottom deck railing, said fourth spindle having an elongated outer side edge; and removing said deck installing device.

21. The method of claim 20 further comprising repeating the steps of claim 19 until said deck railing is completely constructed.

* * * * *